United States Patent [19]
Zohar et al.

[11] Patent Number: 5,605,736
[45] Date of Patent: Feb. 25, 1997

[54] COMPOSITE BELT WEATHERSTRIP MOULDING

[75] Inventors: Avi Zohar, Thornhill; William E. Armstrong, Etobicoke, both of Canada

[73] Assignee: Decoma International Inc., Concord, Canada

[21] Appl. No.: 260,970

[22] Filed: Jun. 15, 1994

[51] Int. Cl.$^6$ ................................................ B60J 10/02
[52] U.S. Cl. ........................... 428/122; 49/475.1; 296/93; 428/358
[58] Field of Search ............................ 428/122, 31, 358; 49/475.1; 296/93

[56] References Cited

U.S. PATENT DOCUMENTS

| | | | |
|---|---|---|---|
| 4,949,507 | 8/1990 | Vaughan | 428/122 X |
| 4,975,306 | 12/1990 | Jackson | 428/122 X |
| 4,977,706 | 12/1990 | Kisanuki | 428/122 X |
| 5,151,307 | 9/1992 | Jackson | 428/122 X |
| 5,154,952 | 10/1992 | Nozaki | 428/122 X |
| 5,182,141 | 1/1993 | Borys et al. | 428/31 X |
| 5,207,027 | 5/1993 | Larsen | 428/122 X |
| 5,352,496 | 10/1994 | Jackson | 428/122 X |

*Primary Examiner*—Henry F. Epstein
*Attorney, Agent, or Firm*—Jane Parsons

[57] ABSTRACT

Belt weatherstrip moulding for motor vehicles or other motor vehicle trim may be made of separate inner and outer components. The inner component may be a base component which is extruded in a flexible material such as an elastomeric material which may be rubber or rubbery materials and which partially envelops an elongate core which is rigid with respect to the extruded material. Preferably the core is aluminum or less preferably stainless steel, galvanized steel or zinc coated steel or it may be a rigid thermoplastic material. The elongate core has an exposed face for attachment to the outer moulding. The outer component is an outer decorative skin and is an injection moulding, preferably polyurethane, although other plastics material may be used. The inner and outer mouldings are adhered together through double sided adhesive tape. It is possible to attach the composite moulding to a vehicle body by means of only one fixed mounting and a number of other mountings which allow relative movement between the vehicle body and the composite trim member to compensate for relative differences in expansion and contraction between the vehicle body and the trim.

12 Claims, 4 Drawing Sheets

COMPOSITE BELT WEATHERSTRIP MOULDING

BACKGROUND OF THE INVENTION

1. Field of the Invention

This invention relates to exterior decorative trim for vehicles, the trim having a stiffened core. The invention particularly relates to belt moulding weatherstrip for use in adjacent moveable or stationary windows.

2. Description of the Prior Art

Exterior elongate trim for vehicles which has been formed of a combination of a stiffened elongate portion and a softer flexible elongate portion. This has caused some difficulties in manufacture. This is especially true when it is desired to provide the outer visible surface of the trim with a high gloss finish.

One method of making trim for this purpose is to extrude a moulding, e.g. of rubber, over an elongate metal core to totally encapsulate it. The resultant moulding which is stiffened by the metal core may be applied to the body of the automobile by any convenient method. It may be possible to apply a second moulding part over this first moulding encapsulating the metal core to provide any decorative finish. Such metal moulding parts are usually fixed by riveting, stapling, screwing or other conventional means.

It has also been proposed to form a two-part trim in which the first extrusion encapsulating the metal core is used as a base for an outer decorative trim part which is formed thereon to by injection moulding.

Still further it has been proposed to co-extrudea base moulding over a metal core and provide an outer decorative skin.

This last described system, while providing trim of a acceptable quality, is very expensive since defects noticed in final operations in the outer decorative trim may involve discarding the whole of any defective two-part moulding.

Generally, difficulties have been encountered in providing a base moulding having a stiffened elongate portion and a more flexible portion which* moulding is easily and economically attachable to a decorative finished portion. Problems have also been encountered in the provision of a high gloss finish of the top decorative portion which withstands the weathering over a period of time. These problems are accentuated where belt mouldings are concerned since belt mouldings require a very flexible lip adjacent to an automobile window which seals against the window while, when the window is a movable window, allowing sliding of the window against it.

The present inventors have addressed the problems of providing an improved, economically manufacturable belt weatherstrip moulding which will withstand weathering of its decorative outer surface and will withstand temperature changes which tend to cause expansions and contractions along the length of the moulding.

SUMMARY OF THE INVENTION

The present invention may have been due at least in part to the surprising realization that it is not necessary to attach trim, especially belt mouldings, to a motor vehicle body by means of fixed points at each end of the trim or moulding. Such fixed point attachments inhibit any relative movement between the trim and the motor vehicle body at the point attachment so that, at the point of attachment, the trim is fixed in an absolute position with respect to the motor vehicle body. Because such fixed points are conventionally near the ends of the trim, expansion and contraction forces have set up appreciable stresses within the trim. The existence of such stresses has dictated some of the considerations as to the structure of trim especially two-part trim such as belt weatherstrip mouldings.

Now that the inventors of the present invention have appreciated that it is only necessary to produce one fixed point attachment and that other attachment points between the vehicle body and the weatherstrip may allow for relative elongate movement due to expansion and contraction, it has been possible for them to devise a novel, inventive structure for the belt moulding itself.

Accordingly the invention provides elongate trim, especially composite belt weatherstrip, for attachment to a motor vehicle body, said weatherstrip comprising, an elongate base member comprising a flexible, plastics material extrudate portion coextensive with and partially enveloping an elongate core portion which is comparatively rigid with respect to said extrudate portion, the core portion having an exposed face on an outer surface of the base member;

an elongate injection moulded, outer decorative trim member of thermoplastic material coextensive with and extending over said outer surface of said elongate base member; and adhesive adhering said exposed face of the core member portion of said elongate base member and an inner surface of said elongate trim member.

Preferably the elongate core portion is metal such as aluminum, stainless steel, galvanised steel, zinc coated steel or other metal. Aluminum is especially preferred. The elongate core portion could, however, be a rigid plastic material.

The extrudate portion may be made of any rubbery material which is sufficiently soft but resilient to take up the form desired as the inner portion of a belt moulding. Thus it must have sufficient properties to follow the form of a car window which is moved against it in opening and closing. Thus the extrudate portion must be flexible, softish and sufficiently sturdy to resist undue wear due to window movement. It should also be resistant to change in properties due to temperature changes in climate. Suitably the extrudate portion may be an elastomeric material such as a synthetic rubber.

The outer decorative trim member very desirably has high gloss outer finish. In the past while this has been relatively east to achieve, it has been difficult to maintain such high gloss finish in varying weather conditions over an appreciable period of time. It has now been found that it is possible to utilize thermoplastic polyurethane or polycarbonates economically in forming the outer decorative trim member by injection moulding. The polyurethane or polycarbonate thermoplastic material may be caused to take up a high gloss finish which is surprisingly found to have high resistance to weathering and has high durability.

The adhesive is very preferably double faced adhesive tape, for example an acrylic adhesive tape such as those identified by code numbers 5314, 5380, 4220 and 4210 made by 3M. The adhesive tape may have a thickness from 0.015 inches to 0.050 inches or more or less.

Adhesive may be used to coat the exposed face of the core or the inner face of the decorative portion instead of using adhesive tape. In practice, however, adhesive tape is easier to use.

The invention also includes a belt weatherstrip according to the invention in combination with a vehicle body. The belt moulding may be attached to the vehicle body by one fixed point inhibiting movement between the moulding and the car body at that point. Such a point may be fixed by a screw attachment. Other attachment points along the length of the trim or belt moulding may allow sliding of the trim or belt moulding to allow it to expand or contract with respect to the vehicle body. Such other attachments may be clips on the vehicle body allowing sliding of the trim or moulding therein.

The invention also includes a method of forming composite belt weatherstrip for attachment to a motor vehicle body said weatherstrip comprising, forming an elongate base member by extruding a flexible, plastic material extrudate portion coextensive with and partially enveloping an elongate core portion which is comparatively rigid with respect to said extrudate portion, such that the core portion has an exposed elongate face or an outer face of the base member;

injection moulding from thermoplastic material an elongate, outer decorative elongate trim member having an inner surface for attachment to an outer surface of said elongate base member; and adhering the inner surface of the trim member to the exposed elongate face of the core portion of the base member through double faced adhesive tape.

BRIEF DESCRIPTION OF THE DRAWINGS

An embodiment of the invention will now be described by way of example with reference to the drawings, in which.

DETAILED DESCRIPTION OF A PREFERRED EMBODIMENT

Figure 1:
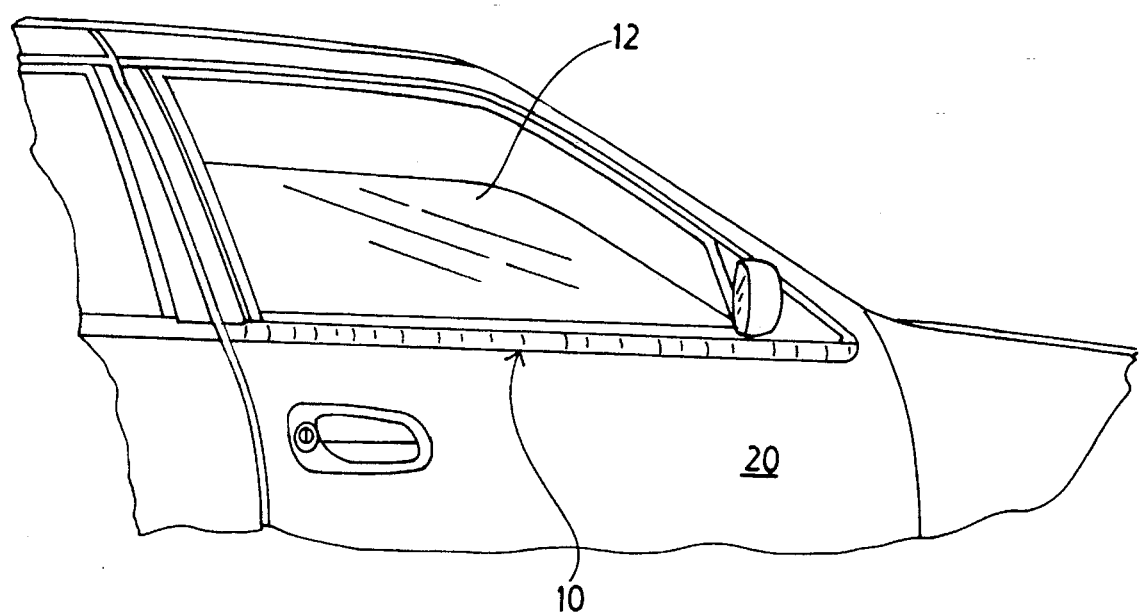
FIG. 1 is a general view of a belt component juxtaposed against a car window.

In the drawings an embodiment of a belt weatherstrip 10 according to the invention is shown in juxtaposition with a car window 12.

Figure 2:
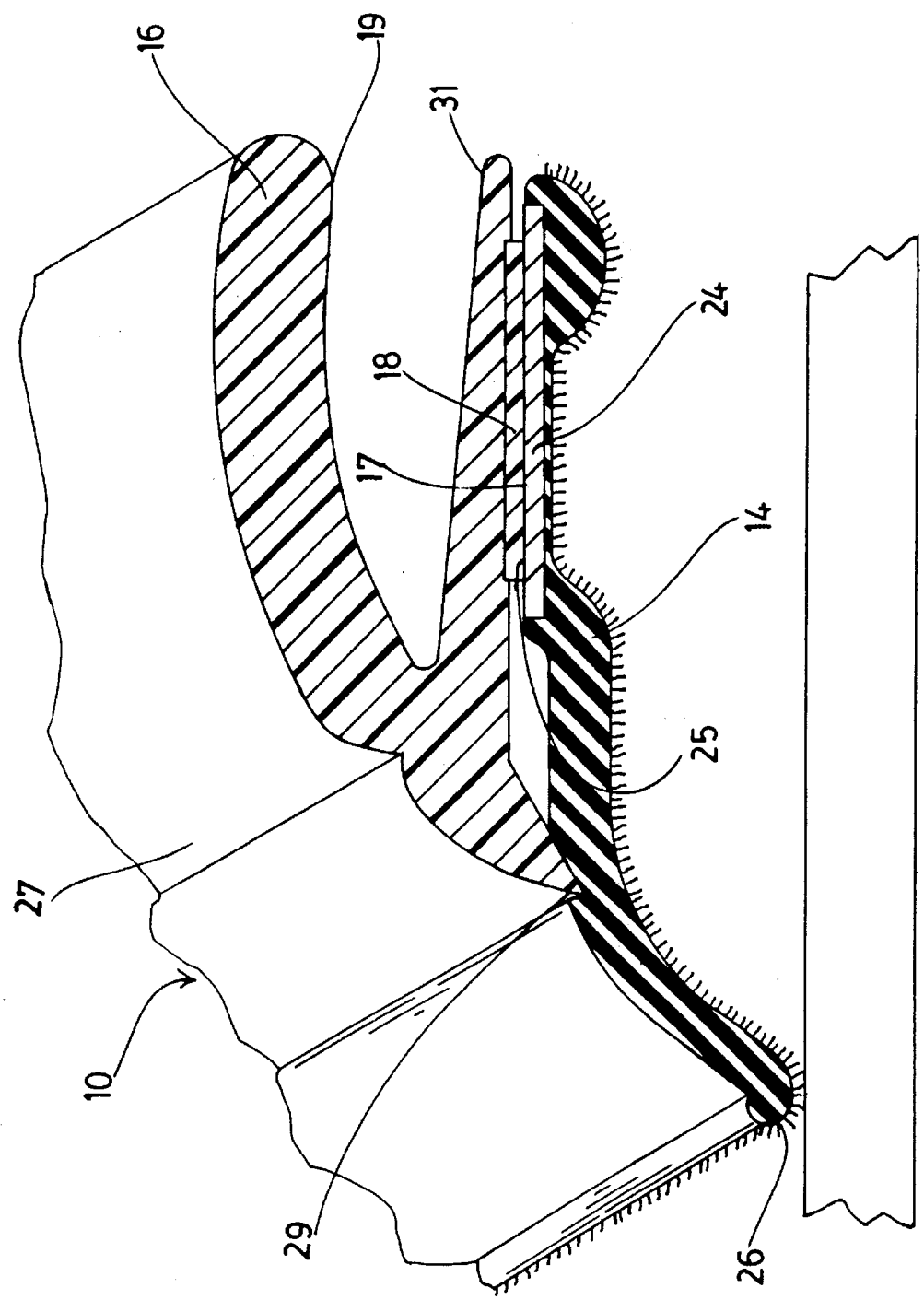
FIG. 2 is a sectional view of a part of a two-part belt component according to the invention, partly in perspective.
Figure 3:
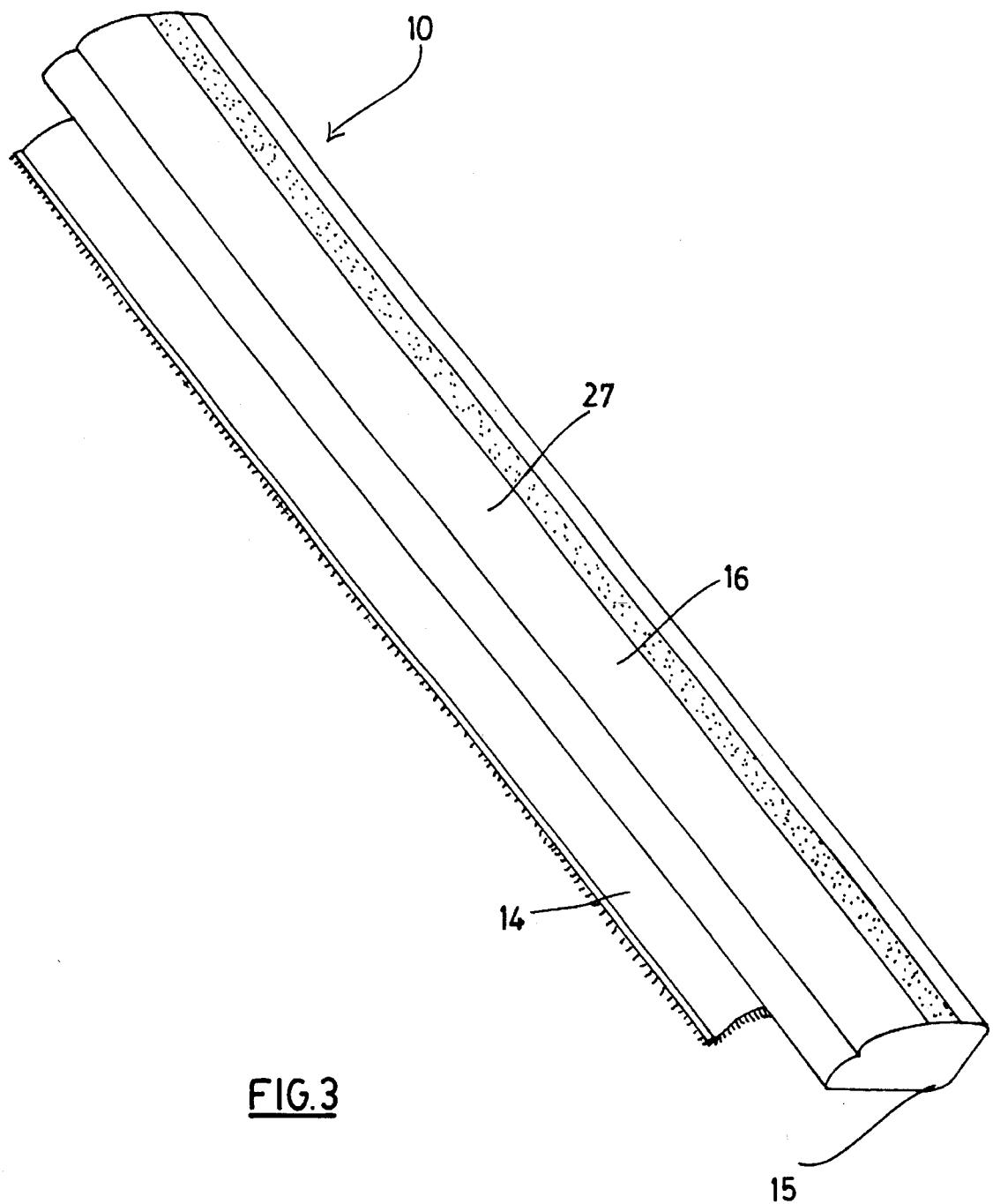
FIG. 3 shows a perspective view of the belt component of FIG. 2 showing an integral end cap of the belt component.

The belt weatherstrip component 10 is shown in more detail in the view of FIG. 2 which is shown partially in section. The belt weatherstrip component 10 is formed of a first base component 14, and a second outer decorative moulding 16. The components 14 and 16 are separately formed and adhered together through double faced tape 18. The base component is attached to the car door body 20. This base component 14, is in the embodiment shown, is a rubber extrusion on a metal core 24 although it may be any rubbery material which is deformably resilient. Various elastomeric materials may be suitable such as ethylene propylene diene monomer or styrene butyl rubber, thermoplastic polymer—Alcryn, thermoplastic polyethylene, thermoplastic polyurethane, thermoplastic polyvinyl polymer. One surface 26 of the base moulding 14 is flocked to wipe against the glass of window 12. One surface 25 of the metal core is exposed for easy fixing to the decorative component 16 by double faced adhesive tape 18.

The metal core 24 is, as shown, a flat extruded metal strip. it might, however, be roll-formed. Other configurations are also possible provided that the contours of the inner surface of the decorative component matches the contour of the exposed face 25 of the metal core.

In some previously known belt weatherstrips it was common practice to entirely encapsulate any stiffening metal strips so that it was necessary to directly adhere the rubber surface to the overlying plastic trim. This could give rise to problems in adhesion. It is believed that it may be advantageous to provide an exposed metal attachment surface of component 14 for fixing to the component 16.

The choice of the flexible extrudate for extrusion over the rigid core, e.g. by cross-head extrusion, may be so that the coefficient of expansion of the extrudate is as close as possible to that of the core. When the core is metal, this may often be achieved with plastics materials extrudate reinforced with fibre, e.g. glass fibre or carbon fibre.

It is preferred that the metal core 24 be formed of aluminum.

Although the use of aluminum is greatly preferred it may also be possible to use other stiffening materials such as galvanised steel, stainless steel, zinc coated steel or even other non-metal materials such as rigid plastic materials.

The outer decorative skin component 16 has a high gloss outer surface 27. High gloss surfaces have been difficult to produce in the past and have had limited durability. They have conventionally been formed by injecting an outer skin of a plastics material such as polyvinyl chloride directly onto a rubber base.

In the illustrated embodiment of the present invention, the outer decorative component 16 has a novel combination of properties in that it is :

a) an injection moulding, b) formed of thermoplastic polyurethane or polycarbonate and, c) formed separately from and adhered to the base component 14.

While it is possible to achieve an outer skin having an initial high gloss finish by utilizing polyvinyl chloride for the outer skin, it is believed that polycarbonate or thermoplastic polyurethane has appreciable advantages. The outer decorative injection component 16 has high scuff resistance, is capable of a high gloss finish which is durable against weathering over a wide temperature range for an appreciable period. A thermoplastic polyurethane or polycarbonate injection moulding may also be produced with a rigidity suitable for fitting onto a base component for adherence thereto through double faced tape. It is also a consideration that the belt weatherstrips of the present invention may, when it is finally necessary to replace them, be easily recycled since they may be separated into their component parts, at least the polyurethane or polycarbonate and the aluminum being easily recycled.

As is the case with the base component 14, it is easy to carry out quality control inspection on the simple outer skin injection moulding before it is assembled into the composite belt weatherstrip 10. Because the quality control inspections can be carried out on the simple moulding and any mouldings having errors may be rejected before assembly into a more complex structure, any wastage of expensive complex structure may be minimized or recycled.

The outer decorative injection moulding component 16 may be assembled with the base component 14 by means of any suitable double faced tape 18 adhering to an inner surface 17 of decorative component 16 and an exposed face 25 of inner core 24 base moulding 14. However, tape sold under the code number 5314, 5380, 4220 or 4210 manufactured by 3M is considered particularly suitable. This tape has very thin foam structure thus allowing relatively intimate contact between the extruded base component 14 and the injection outer skin moulding 16. The actual strength of the adhesive is only necessary to reliably connect the base moulding 14 and the outer skin moulding 16 while allowing for any relatively expansion and contraction between the two. While the aforementioned tape manufactured by 3M is considered particularly suitable, any acrylic double faced tape may be similarly suitable. It may, however, be desirable to roughen the inner surface 17 of the injection outer decorative component to allow for maximum adhesion with the double faced tape.

The composite belt moulding 10 may be attached to the car door body using any conventional fixing means such as screws, rivets or clips but only one fixed mounting 30 is provided. As previously discussed, it has been conventional to attach belt mouldings to the car body to at least two fixed end points to lock the strip against expansion between these points. When one fixed, one floating end points are utilized considerable stresses may be set up on the length of moulding between those points. It may be for this reason that it has been found necessary in the past to form unitary one piece mouldings, i.e. mouldings in which the base rubber moulding wholly encapsulates the metal core and outer decorative extruded moulding is unitarily formed either by co-extrusion with the rubber moulding or by extrusion directly thereover.

The injection moulded outer decorative component 16 should have integrally moulded end caps 15 to provide a finished appearance to the strip. In addition, the top edge 29 may be sharp and may dent the surface of the soft, flexible extruded component 14 so that it is lightly embedded thereinto. Although lower lip 19 of decorative component 14 is shown rounded, it also may be sharp and directed towards the surface of door 20 to blend into it and seal against it. Alternatively or additionally, a second softer material may be used along lower edge 19 to seal with the door 20 as may be seen from the flattened portion 21 in FIG. 4.

Figure 4:
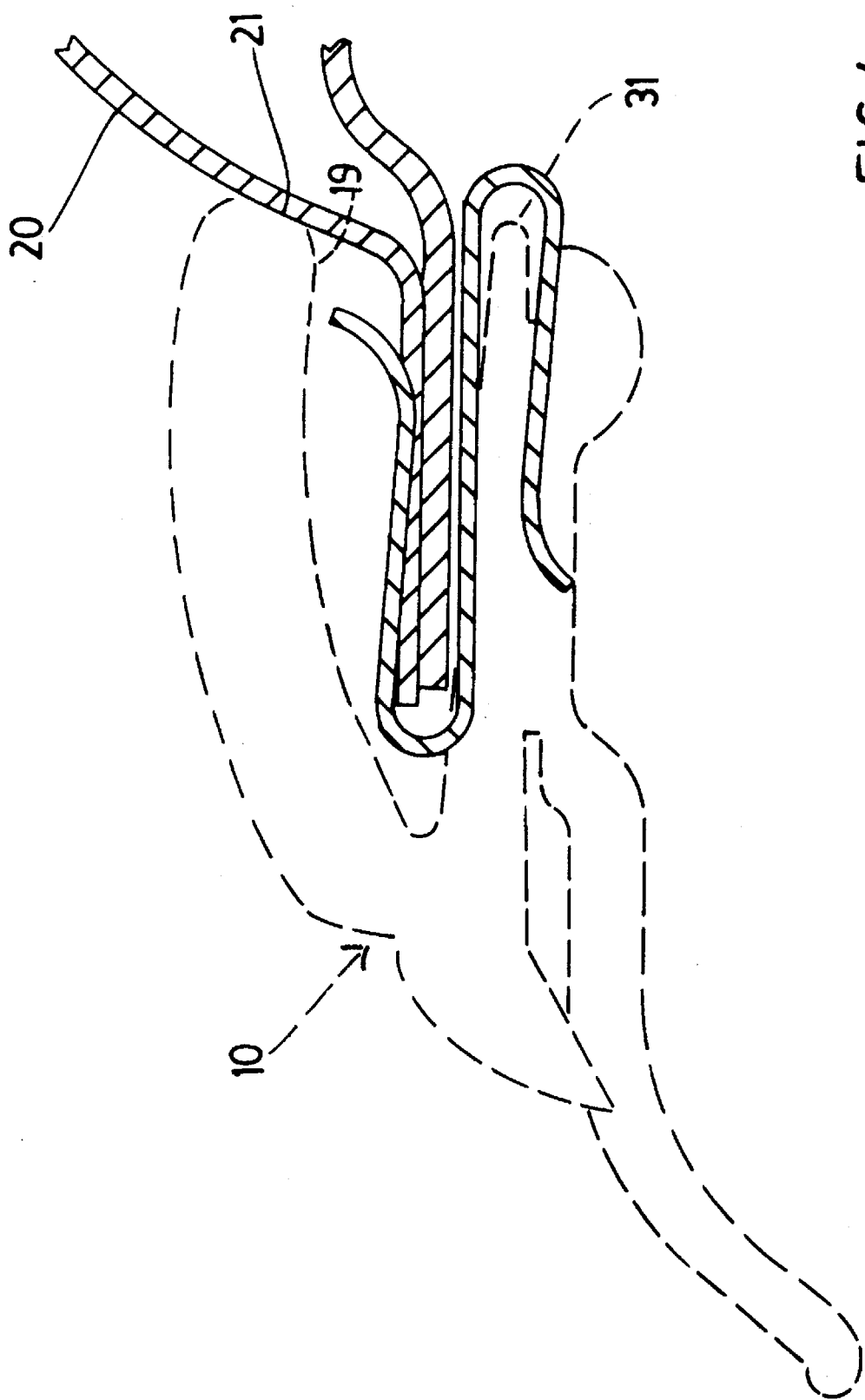
FIG. 4 is a sketch showing means of fixing a belt moulding according to the invention to an automobile body.

As may be seen from FIG. 4 a composite belt weatherstrip 10 according to the invention may be attached to a car door body by means of one fixed point only. Thus, a belt weatherstrip 10 may be attached to a car door body by means of, for example, a spring clip 30 is S-shaped to grip an upper edge of door 20 in the one bend and the downward depending leg 31 of composite belt 10 in the other bend thus allowing for lengthwise expansion of the belt relative to the door 20.

While a specific embodiment of the invention has been described with reference to belt mouldings, it is clear that the invention may be used for any automobile trim where it is desired apply an outer skin decorative moulding over a base moulding. Vehicle body trim, especially belt weatherstrip moulding 10 according to the invention may be manufactured in a two-part manufacturing process.

First base moulding 14 is extruded directly by cross-head extrusion onto core member 24 whose surface 25 is protected from being covered by the unset extrudate.

After formation of the base moulding component as described, quality control on this unit may be carried out.

In a separate step the outer decorative trim is moulded in a conventional injection moulding process and quality control is carried out on that unit. Once both the base component 14 and the outer decorative component 16 have been formed and inspected they may be adhered together using double faced tape.

Once the components of the composite belt weatherstrip 10 have been formed they may be applied to the vehicle body. The base component 14 may be fixed to the car body at prechosen attachment points of the base component and the car body respectively. Once the base component has been attached to the vehicle body the outer decorative trim may be adhered thereover if it has not already been preassembled. Apart from the advantage gained by the high gloss surface which is possible when using injection moulded polyurethane, it is clear from the Figures that the injection moulding for the outer decorative trim allows ends 38 of the trim to a form a close and finished end of the moulding strip.

We claim:

1. A composite belt weatherstrip for attachment to a motor vehicle body, said weatherstrip comprising, an elongate base member comprising a flexible, plastic material extrudate portion coextensive with and partially enveloping an elongate core portion which consists of a flat strip which is comparatively rigid with respect to said extrudate portion, the core portion having an exposed face flush with an outer surface of the base member;

an elongate injection moulding as an outer decorative trim member of thermoplastic material coextensive with and extending over an outer surface of said elongate base member; and double faced adhesive tape adhering said exposed face of the core member portion of said elongate base member and an inner surface of said outer decorative trim member.

2. A composite belt weatherstrip as claimed in claim 1 in which the elongate core portion is metal.

3. A composite belt weatherstrip as claimed in claim 2 in which the metal is aluminum.

4. A composite belt weatherstrip as claimed in claim 1 in which the elongate core portion is a rigid thermoplastic material.

5. A composite belt weatherstrip as claimed in claim 1 in which the extrudate portion is an elastomeric material.

6. A composite belt weatherstrip as claimed in claim 5 in which the elastomeric material is rubber.

7. A composite belt weatherstrip as claimed in claim 1 in which the extrudate portion is reinforced with fibre.

8. A composite belt weatherstrip as claimed in claim 1 in which the thermoplastic material is a thermoplastic polyurethane.

9. A composite belt weatherstrip as claimed in claim 1 in which the thermoplastic material is a polycarbonate.

10. A composite belt weatherstrip as claimed in claim 1 in which the trim member has a gloss outer surface.

11. A composite belt weatherstrip as claimed in claim 1 in which the double faced adhesive tape is acrylic adhesive tape.

12. A composite belt weatherstrip as claimed in claim 1 in which the trim member includes integral end caps.

\* \* \* \* \*